Figure 1:
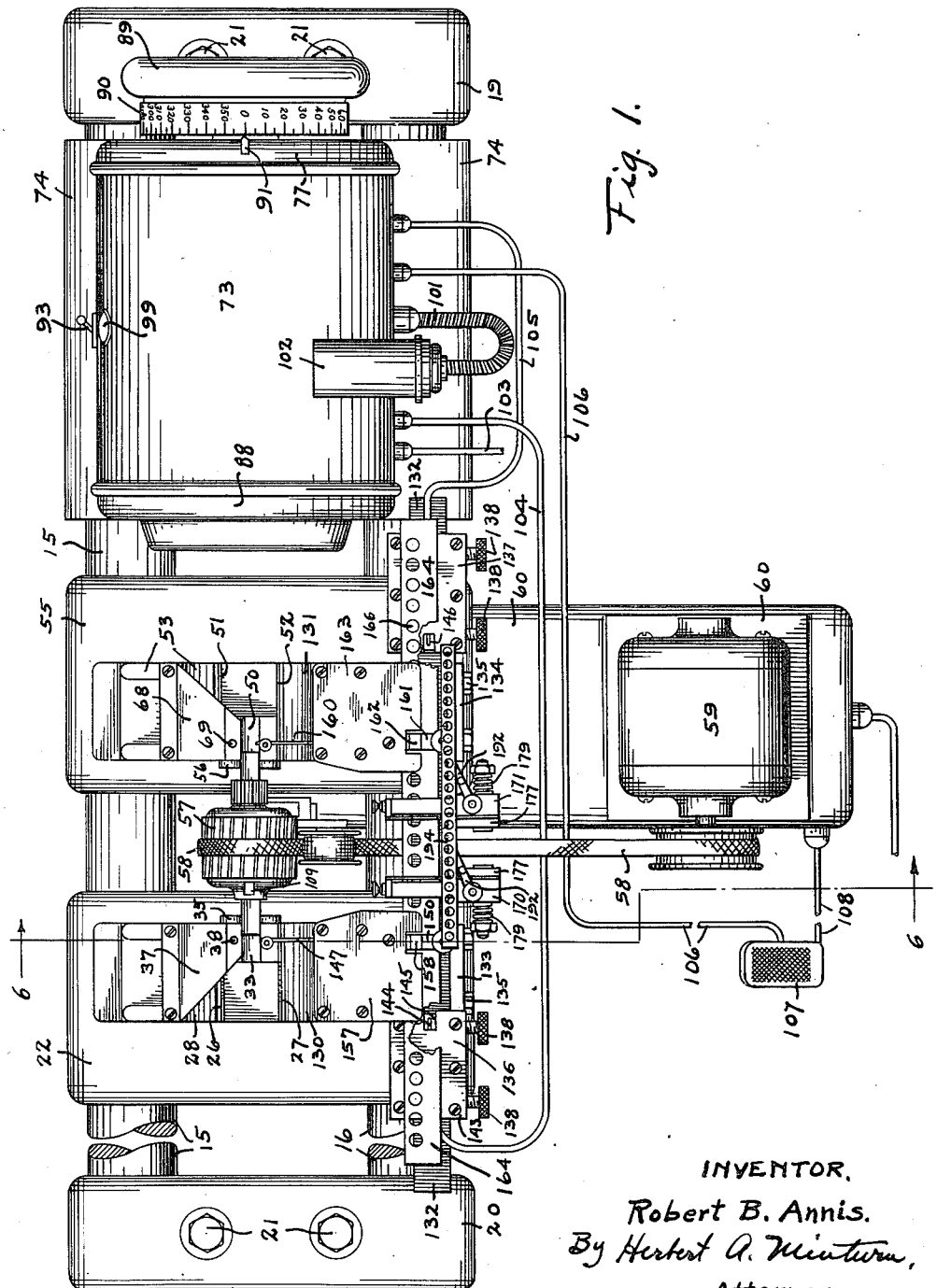

May 20, 1947.　　　R. B. ANNIS　　　2,420,765
DYNAMIC BALANCER
Filed March 25, 1944　　　6 Sheets-Sheet 1

INVENTOR.
Robert B. Annis.
By Herbert A. Minturn,
Attorney.

May 20, 1947.    R. B. ANNIS    2,420,765
DYNAMIC BALANCER
Filed March 25, 1944    6 Sheets-Sheet 2
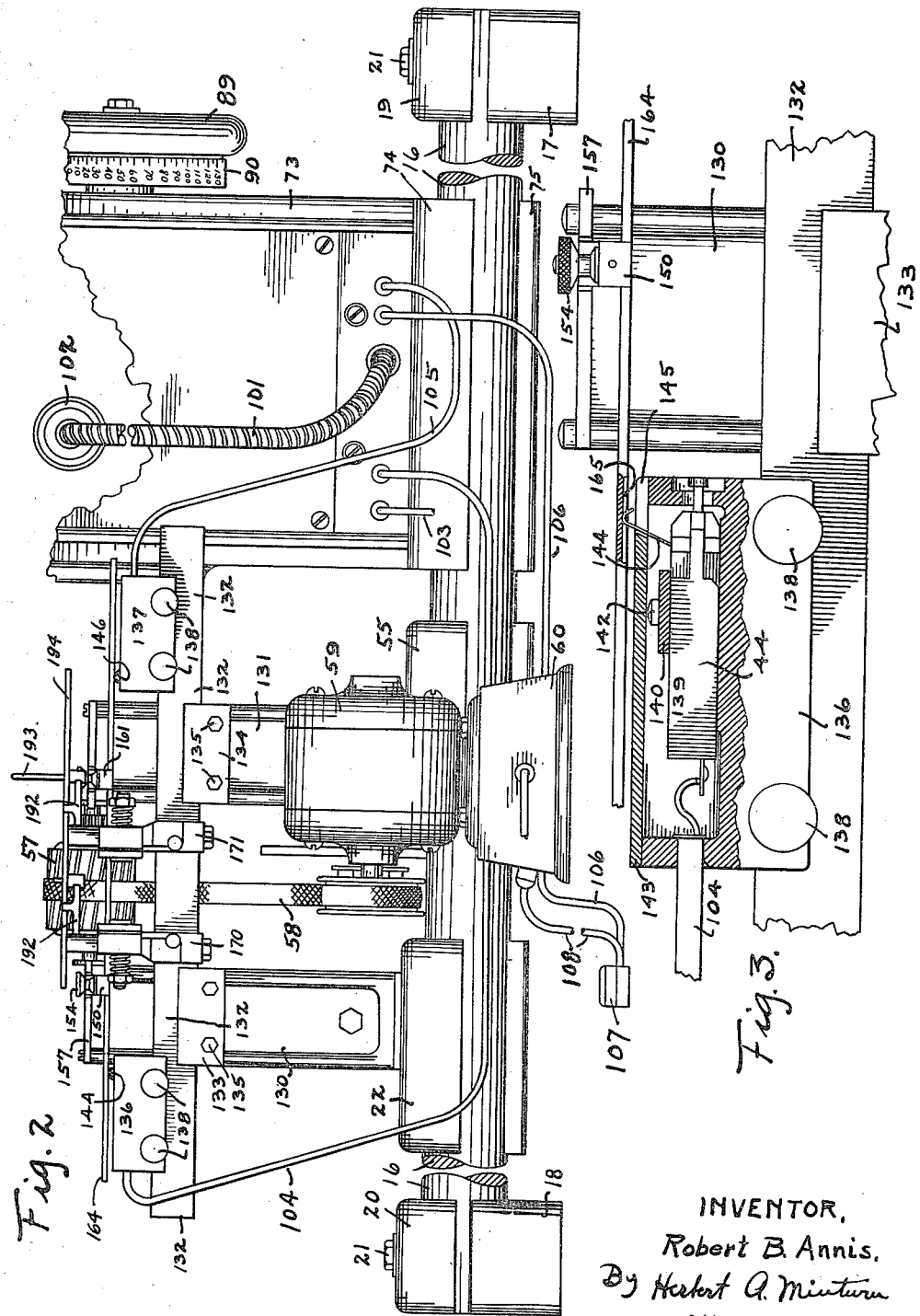
INVENTOR,
Robert B. Annis.
By Herbert A. Minturn
Attorney.

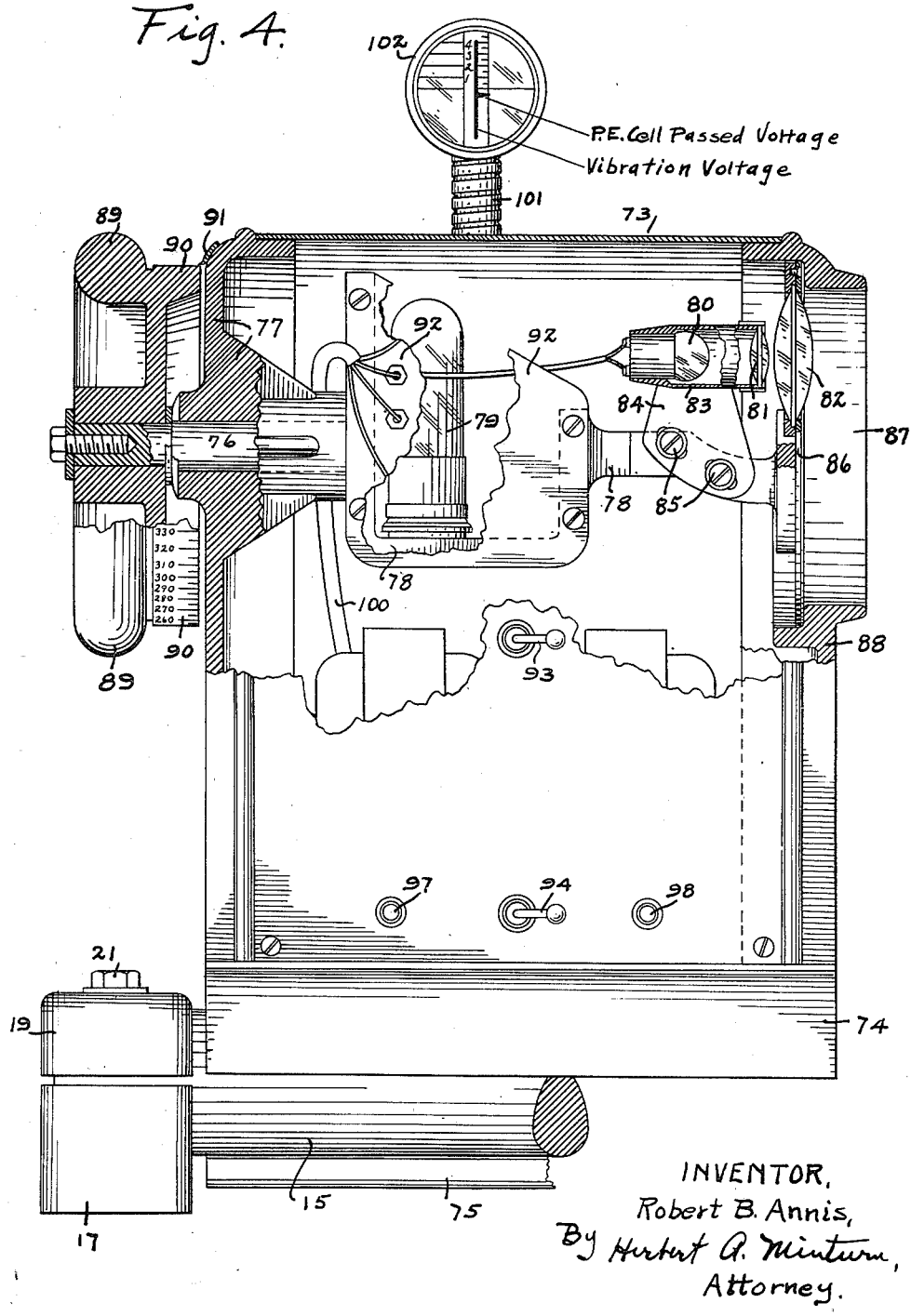

May 20, 1947. R. B. ANNIS 2,420,765
DYNAMIC BALANCER
Filed March 25, 1944 6 Sheets-Sheet 4

INVENTOR,
Robert B. Annis.
By Herbert A. Minturn,
Attorney.

May 20, 1947.　　　R. B. ANNIS　　　2,420,765
DYNAMIC BALANCER
Filed March 25, 1944　　　6 Sheets-Sheet 5
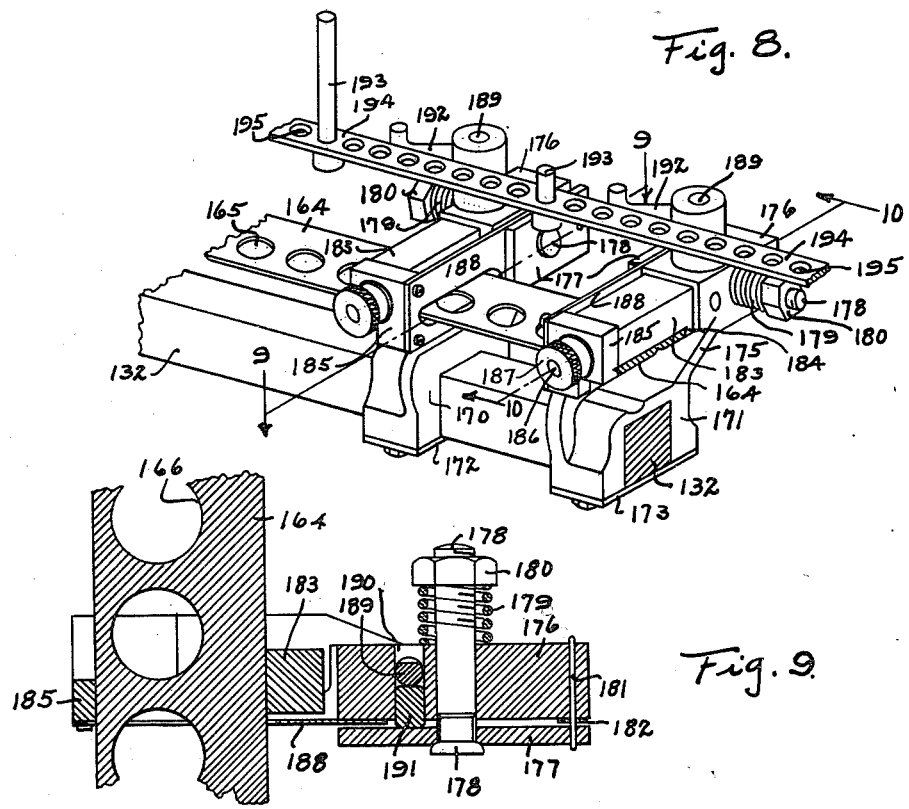
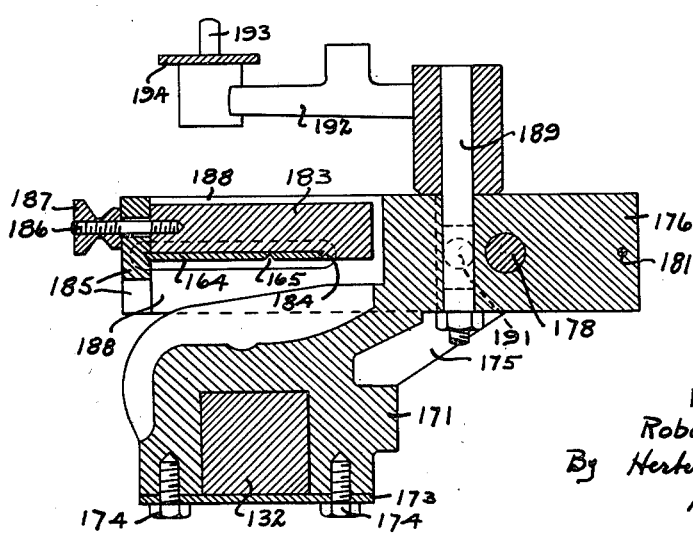
INVENTOR,
Robert B. Annis,
By Herbert Q. Minturn
Attorney.

May 20, 1947. R. B. ANNIS 2,420,765
DYNAMIC BALANCER
Filed March 25, 1944 6 Sheets-Sheet 6

INVENTOR.
Robert B. Annis,
By Herbert Q. Minturn,
Attorney.

Patented May 20, 1947

2,420,765

UNITED STATES PATENT OFFICE 2,420,765

DYNAMIC BALANCER

Robert B. Annis, Indianapolis, Ind.

Application March 25, 1944, Serial No. 528,067

9 Claims. (Cl. 73—66)

Reference is made to my copending application, Serial Number 480,544, filed March 25, 1943, which has matured into Patent Number 2,382,843, of which this application is a continuation in part.

This invention relates to means of an electronic type for determining and indicating both the amount and position of unbalance in a rotating part by means of a single reading of the "trace" to be observed on the screen of a cathode ray tube. The means is incorporated in a precision dynamic balancing machine wherein a pulsating voltage is produced by vibration set up by the unbalance of the rotating part to have that voltage applied to one set of the beam control plates in the cathode ray tube and to have a control voltage applied to the other set of cathode ray tube plates, the control voltage being fluctuated by a special photoelectric cell "coupled" to the part being checked for balance, the "coupling" being effected through the medium of a beam of light reflected from or controlled by the rotating part, all without mechanical coupling between the electric generator and the rotating part.

The only indicator employed on the balancing device is the cathode ray tube which is an inertialess electrical device that responds instantly to voltages applied to its control plates. As is standard construction, these two sets of control plates are at right angles to each other so that a voltage applied to one set will cause the cathode ray beam to move across the screen of the tube, such as horizontally; and when a voltage is applied to the other set of control plates, the cathode ray beam will move or trace vertically. The amount of deflection of this cathode ray beam is proportional to the amount of voltage applied to the control plates. This shifting of the cathode ray beam is used to indicate the amplitude of vibration or the amount of unbalance of the part being checked.

Now if two alternating current voltages of the same frequency are respectively applied to the two sets of the control plates of a cathode ray tube, the phase relation between these two voltages may be easily determined by means of the trace patterns observed on the screen of the tube. This feature of the cathode ray tube is used to indicate angular positions of the unbalance of the part being checked.

The invention provides for receiving the part to be checked for balance on two spring supported bearings on which the part is revolved. Lateral vibrations of these spring supported bearings is transmitted mechanically through a spring steel connector wire to individual vibration pickup units, one unit for each bearing. These units may be electromagnetic, photoelectric or piezoelectric in type, the purpose of the unit being to change the mechanical vibration of the particular bearing into a corresponding electrical pulsating voltage. In the present form of the invention herein shown and described, the piezoelectric type of unit is employed. The voltage from the two bearing units is selectively applied to the vertical set of cathode ray tube plates. This control voltage alternates at the same speed or frequency as that of the mechanical vibration, and is proportional to the amplitude of vibration. The height of the trace on the scale of the cathode ray tube will indicate the amount of unbalance. The absence of any vertical height to the trace indicates there is no vibration of the bearing support, the induced voltage from which is being applied to the control plates of the tube, and consequently the revolving part is then indicated to be in balance.

The position of unbalance which must be made known to the operator in order to permit him to make the proper correction at the proper location on the part being tested, is indicated by this invention by the phase relation between the voltage above indicated as being produced by the vibration, and a second voltage that is applied in conjunction with the revolving part being tested. This control voltage, which may be indicated as that due to rotation of the part, is applied by a special photoelectric system located in a headstock or scanning head of the structure. This system consists of a light source, a photosensitive or photoelectric cell (hereinafter identified as a PE cell), and an associated optical system, all mounted in such a manner as to permit those elements to be turned through 360 degrees by the rotation of a calibrated handwheel. The axis of rotation of those elements is in line and parallel with that of the part being checked.

For maximum efficiency, the lens system for both the PE cell and the light source are on the same optical axis. The light from the exciter lamp filament is projected and focused onto the end of the scanned surface of the part being checked coincident with the focus of the PE cell optical system. The amplified varied voltage of the PE cell is applied to the horizontal set of the cathode ray tube control plates. By turning the scanning head with the above indicated elements by the handwheel, the phase relation between the vibration "amount" voltage on the vertical plates, and the "angle" voltage on the horizontal plates can be shifted and readily determined by observation of the visible trace on the screen of the tube.

In any revolving part that has appreciable length, there will be a reactive effect resulting from the unbalance toward one end, generally causing the opposite end to tend to vibrate 180 degrees out of phase in relation to the vibration of the unbalanced end. This reactive effect can be nullified or cancelled so that the end being checked will not be affected by any unbalanced condition of the opposite end. Elimination of this reactive effect can be accomplished by any one of the three methods, namely, mechanically restraining the end opposite from that being checked so that it can not vibrate, thus preventing any reactive vibration; second, electrically adding algebraically the two voltages from the two pickup units, assuming that in the revolving part one end is balanced and the other end is unbalanced, one pickup will receive vibration directly caused by displacement from the normal axis of rotation created by unbalance of that particular pickup unit connected end, while the other pickup will receive vibration due purely to the reactive displacement of the part (the A. C. voltages produced by these two pickups are usually 180 degrees out of phase, or are of opposite, instantaneous polarity, thus allowing the voltages to be added in various proportions to cancel each other or produce a zero reading, this adding being accomplished in the present invention by a simple potentiometer input circuit); and third, shifting the pickup units themselves to have one pickup unit shifted to a nodal point. For a given location of a correction plane through the revolving part, the free axis of the part being checked will tilt (due to unbalance) in such a way that one point along that free axis will act as a pivot or a node. The first and third methods form the subject matter of the present invention.

Figure 5:
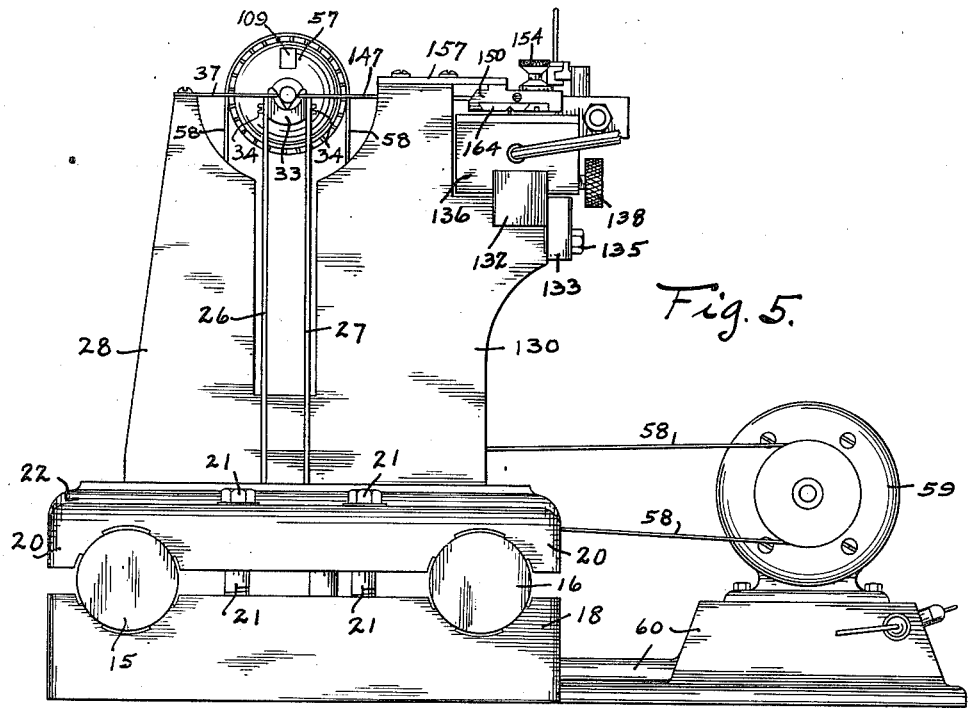
Figure 6:
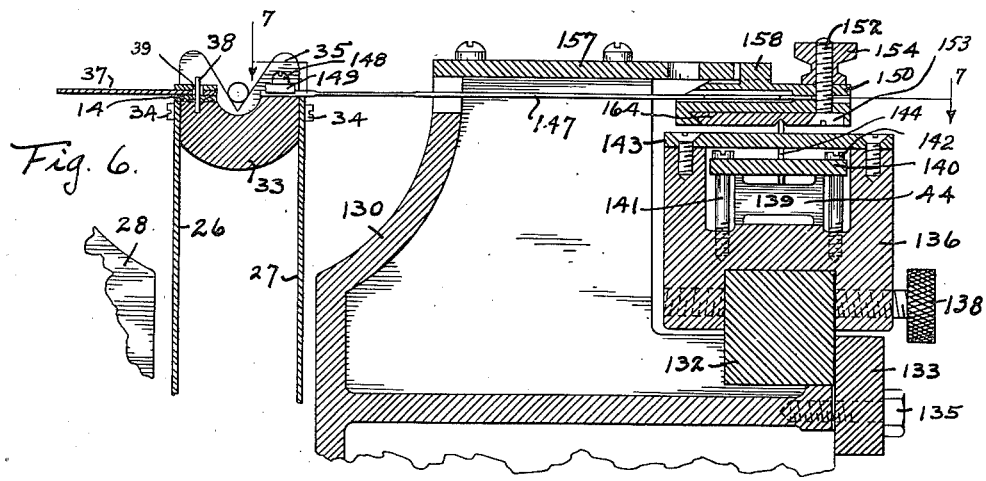
Figure 7:
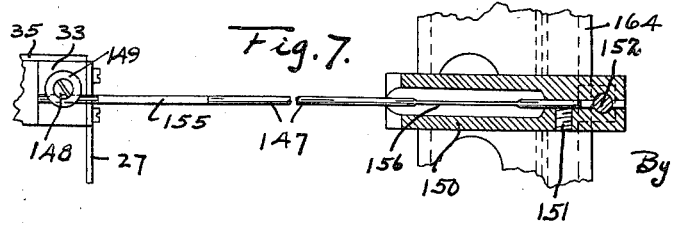

An important object of the invention is to eliminate any mechanical coupling between a control voltage device and a part being checked for balance or unbalance. A further important object of the invention is to permit extremely rapid checking of and the indicating of both the amount and position of the unbalance in production work with extreme accuracy and minimum amount of time employed on each part being checked. These and many objects and advantages of the invention, including the unique association of the various elements as specifically set forth in the appended claims, will become apparent to those versed in the art in the following description of the invention as illustrated in the accompanying drawings, in which Fig. 1 is a top plan view of a structure embodying the invention;

Fig. 2, a view in rear elevation;

Fig. 3, a detail in rear elevation and partial section on an enlarged scale of a shiftable pickup unit mounting;

Fig. 4, a view in front elevation and partial section on an enlarged scale of the scanning head;

Fig. 5, a view in right hand end elevation of the structure;

Fig. 6, a detail in enlarged scale, in transverse section on the line 6—6 in Fig. 1;

Fig. 7, a detail in horizontal transverse section on the line 7—7 in Fig. 6;

Fig. 8, a detail on enlarged scale, in rear perspective of the nodal point clamping means;

Fig. 9, a horizontal section on the line 9—9 in Fig. 8;

Fig. 10, a vertical section on the line 10—10 in Fig. 8; and

Figure 11:
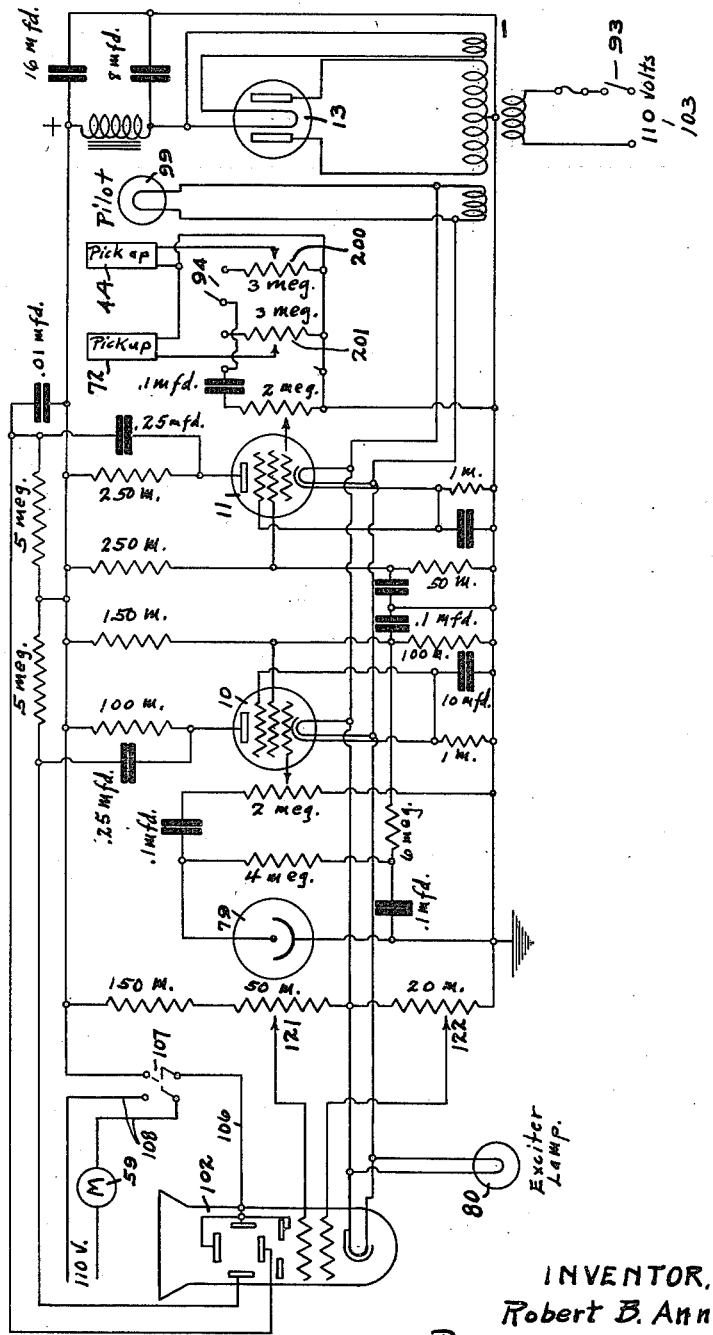

Fig. 11, a wiring diagram.

Like characters of reference indicate like parts in the several views of the drawings.

CONSTRUCTION

A pair of bars 15 and 16, herein shown as being cylindrical, are selected to have sufficient cross-sectional area to make them rigid within the limit of use of the balancing machine. These bars 15 and 16 are supported in spaced apart parallel relation on end blocks 17 and 18 respectively by having the bars resting on these blocks in bearings provided thereacross. In order to hold the bars 15 and 16 rigidly in alignment, clamp blocks 19 and 20, each having bearings thereacross, are placed down on the top sides of the bars 15 and 16 above the respective under blocks 17 and 18 and these clamp blocks 19 and 20 are there secured in their respective positions by means of cap screws 21, herein shown as two in number in each instance, passing through the clamp blocks and down into the under bearing blocks. These bars 15 and 16 and their end supports thus described constitute the base for the light head and the structure for supporting the specimen or part to be checked.

Test piece bearing supports 22 and 55 are adjustably mounted in any suitable manner along the bars 15 and 16. The support 22 carries in fixed manner by their lower ends a pair of leaf springs 26 and 27 spaced apart in parallel, vertical alignment to have their upper ends free to vibrate horizontally between fixed upwardly extending brackets 28 and 130. Between the upper ends of these springs 26 and 27 is secured a bearing block 33 by any suitable means, such as by screws 34 respectively passing through the upper ends of the two springs and engaging within the block 33 therebetween. On the end of the block 33, presented at those edges of the springs 26 and 27 that are parallel with the sides of the brackets 28 and 130, is mounted a bearing plate 35. This bearing plate 35 is thus positioned to be at the sides of the brackets 28 and 130 instead of toward the centers thereof. It is to be noted that the bearing plate 35 is provided with a notch entering from the upper side which provides for centering of the shaft of the member to be tested.

The top ends of the brackets 28 and 130 are in effect spaced apart from the upper ends of the springs 26 and 27 by reason of the fact that both brackets 28 and 130 are cut away to have their upper, inner opposing faces concave so as to provide clearance therebetween.

From one of the brackets, herein shown as bracket 28, extends a plate 37 over the stop of one side of the bearing block 33 to be spaced slightly thereabove out of contact therewith. The plate 37, herein shown as substantially triangular shaped, is provided with a hole therethrough in that portion overlying the bearing block 33, and a pin 38 fixed to the block 33 extends upwardly and normally freely through the hole 39 in that plate 37, Fig. 6. The diameter of this hole 39 minus the diameter of the pin 38 constitutes the limiting factors of lateral travel of the block 33 upon yielding of the springs 26 and 27, these springs normally holding or positioning the pin 38 centrally of the hole 39. It is to be understood that the plate 37 is rigidly fixed by its front edge portion along the top end of the bracket 28.

Between the under side of the plate 37 and the top side of the bearing block 33, Fig. 6, is interposed a thin pad of felt 14 as a means for damping lateral vibration of the bearing block 33. The plate 37 is provided to exert a slight downward pressure on this felt for the damping effect. The damping effect may be varied by varying the pressure of the plate 37 on the felt and this pressure variation may be had by bending the plate 37 upwardly or downwardly as the requirement may be. This damping of the travel of the bearing block 33 tends to eliminate low frequency hunting and also tends to prevent external vibrations from affecting the vibration of the block 33.

In the same manner a second bearing block 50 is supported in axial alignment with the block 33 by means of springs 51 and 52 carried between front and rear brackets 53 and 131 respectively. The springs 51 and 52 are counterparts of springs 26 and 27. The bearing block 50 carries a bearing plate 56 which is a counterpart of the bearing plate 35 on the block 33. The bearing plates 35 and 56 are positioned in opposition one to the other in axial alignment and are substantially within the respective planes of the inner opposing faces of the respective pairs of brackets 28, 130 and 53, 131 whereby these bearing plates may be positioned as close together as possible to rotatively support the piece to be checked for balance.

The bearing block 50 has its horizontal travel limited by means of a plate 68 which operates in the same manner as the plate 37 to extend over the top of one side of the bearing block 50 to have a pin 69 extend upwardly through a hole in the plate 68, the limit of travel being the clearance between the pin 69 and the margin of the hole. A felt pad is interposed between the plate 68 and the block 50 to operate in the same manner as described above in reference to the felt pad 14 and block 33.

For convenience in terminology, the complete unit mounted on the support 22 will be designated as the right-hand vibration pickup carriage and the assembly mounted on the support 55 will be termed the left-hand vibration pickup carriage. The purpose of making these two carriages to be adjustably positioned along the bars 15 and 16 is simply to provide an adjustable spacing therebetween in accordance with the length between bearings of the piece to be balanced.

While of course any rotatable element within the proper range of size for the selected dimensions of the two carriages may be checked for balance, for the purpose of illustration, a motor armature 57 is selected as the part to be checked for balance and is herein shown as having its shaft carried by the bearing plates 35 and 56.

In order to rotate the armature 57 about its own axis, a light flexible fabric belt 58 is looped around the periphery of the armature 57 (around the pole pieces in the illustrated form of armature) and this belt is carried downwardly with both sides in substantially vertically aligned positions. A drive motor 59 is mounted upon a separate elongated base 60 on a rear end portion of that base while the forward portion of the base is positioned to extend under the bar 16.

A headstock, generally designated by the numeral 73, is provided with a base 74 that is notched from its under side to fit over and slide along the bars 15 and 16. The head stock is secured in selected positions along these bars by an under clamp bar 75 engaging the under sides of the bars 15 and 16 and pulled toward the base 74 to afford the same clamping arrangement as provided for the support 22 of the right-hand carriage.

In the upper portion of the headstock 73 is mounted a scanning head including an optical system carried by a shaft 76 rotatably mounted in a bore provided through the end wall 77, the axis of the shaft 76 being parallel to the axes of the bars 15 and 16. On the inner end of the shaft 76 within the headstock 73 is fixed a bracket 78 formed with an off center seat to carry a PE cell 79 thereon, and further formed to extend to the right to carry an exciter lamp 80, and still further to the right a lens system, herein shown in the present form as being comprised of the two lenses 81 and 82. The mountings of these various elements is made to be such that the two lenses 81 and 82 are on the same optical axis.

The exciter lamp 80 is mounted within a tube 83 carried by an arm 84 that is adjustably fixed to the bracket 78 by means of a pair of screws 85 passing through slots in the arm 84 and screw-threadedly engaging the bracket 78 to the end that the axis of the tube 83 may be tilted in reference to the axis of the shaft 76, the tube 83 being mounted, in the present instance, to one side of that shaft axis. The exciter lamp lens 81 is positioned across the tube 83 at the end opposite that end into which the lamp 80 is inserted and carried. The focusing of the beam of light from the lamp 80 through the lenses 81 and 82 is obtained by axially shifting the lamp 80 within its friction mounting within the end of the tube 83.

The PE cell lens 82 is fixed in position back of an opening in an opaque disc 86 that is mounted across the end of the bracket 78 to be rotatable therewith. This disc 86 forms a closure across a circular window 87 that is provided through the right-hand end wall 88 of the headstock 73. This structure permits shifting of the exciter lamp light beam throughout at least 360 degrees of travel around the axis of the shaft 76. To shift the light beam, a handwheel 89 is fixed on the outer extending end of the shaft 76 whereby the wheel may be grasped by the operator's hand to cause the desired or required shifting. Secured to the handwheel 89, herein shown as integrally, is a drum 90 which is calibrated in degrees whereby the angular position of the emitted beam of light from the exciter lamp 80 may be determined in reference to the fixed pointer 91 carried on the upper side of the end wall 77 of the headstock 73. Provision is made for suitably placing the exciter lamp and the PE cell in respective electric circuits without interfering with the 360 degrees travel of the scanning head. This may be accomplished in the usual manner by brushes riding on drum rings, or more simply, as herein shown, a terminal panel 92 is fixed on the side of the bracket 78 whereby suitable flexible leads of sufficient length may be carried therefrom in a cable 100 down to an amplifying and control unit mounted within the headstock 73 on the base 74. The exciter lamp 80 and the PE cell 79 are connected with terminals on this panel.

On the forward wall of the headstock 73 is mounted a power line input control switch 93; a left-right selector switch 94 interconnecting respectively with the left and right-hand pickup units 72 and 44; a horizontal gain control (angle)

97; a vertical gain control (amount) 98; and a pilot lamp 99, all of which will be more fully explained herein below in describing the operation of the device.

Extending from the rear side of the headstock 73 is a cable carrying flexible arm 101 which supports on its upper forwardly directed end a cathode ray tube 102 (No. "913," being the commercial designation of one type of tube usable). This tube is of the type which has a generally cylindrical metallic incasing shell with the screen visible across a front opening and is provided with a scale across the screen. A power input cable 103 enters the headstock 73 from the rear and shielded conductor cables 104 and 105 lead respectively from the right and left-hand vibration pickup carriages to enter the headstock 73. In addition, a cathode ray plate voltage control cable 106 is interconnected between a foot controlled switch 107 and the headstock 73.

This foot controlled switch 107 (normally on the floor in front of the balancer) is further employed to start and stop the drive motor 59 through the cable 108. Reference is made to the complete wiring diagram, Fig. 11, to indicate the electrical hook-up between these various elements and also to show the diagram of the complete electrical system. Observation of the diagram will indicate the system to consist essentially of the power input rectifier circuit using the tube 13; the vibration pickup input circuits; the PE cell 79 and its input circuit; the amplifying circuit employing the tubes 11 and 10 for amplifying both the outputs of the pickups and the PE cell; and the cathode ray tube 102.

The rear brackets 130 and 131 carry in seats across their rear upper end portions a rigid bar 132. This bar, in the present showing, is rectangular in cross-section and is longitudinally adjustably positioned in reference to the supporting brackets 130 and 131 and held by means of the respective clamp bars 133 and 134, carried by the brackets 130 and 131 respectively by means of cap screws 135. That is, the bar 132 may be released from compressive engagement with either one or both of the brackets 130 and 131 to permit not only those brackets being adjustably spaced one from the other, but also to permit the bar 132 to be shifted to either the right or the left of those brackets as an additional length of the bar therebeyond may be required.

The upper portions of each of the brackets 130 and 131 are so formed as to permit pickup unit carriages 136 and 137 to engage with the upper portion of the bar 132 and slide therealong. In the present form of the invention, these carriages 136 and 137 are identical in shape and size and each is provided with an under rectangular slot extending longitudinally thereacross, into which slot the upper portion of the bar 132 is slidingly received. In effect, each carriage 136 and 137 has a front and a rear leg extending down on the corresponding sides of the bar 132. To permit the carriages to be securely engaged in any selected position of travel along the bar 132, thumb screws 138 (two in each carriage) are employed to be screw-threadedly carried through the rear leg of each carriage and abut the rear side of the bar 132. If need be, the carriages 136 and 137 may be shifted entirely along the length of the bar 132 without interference with any other part of the balancer, particularly the brackets 130 and 131.

Within each carriage 136 and 137 is located a pickup unit 44 and 72 respectively, herein shown as of the piezoelectric type embodied in the commercial form within a metallic case 139. The pickup unit in each carriage is secured in position by means of a crossbar 140 extending over the unit and having screws 141 and 142 carried down through the ends of the bar 140 along the outer sides of the unit and screw-threadedly engaged in the carriage. A carriage cover plate 143 is provided to cover over the pickup unit in each instance and protect it from external damage. A pickup unit operating wire 144 is secured to the unit 44 in the usual manner as the operating member to function by lateral movement, that is, in respect to the balancer as a whole in a fore and aft direction.

This wire 144 is inclined from the unit 44 to the right when viewed from behind the machine, and has its upper end curved around and downwardly in the nature of a hook to form an upper arcuate end which projects above the top level of the cover 143, through a slot 145 formed in the end thereof. The slot 145 has a width sufficient to permit ample lateral travel of the wire 144 but is limited in width to prevent undue bending of the wire 144 as a protective factor. Also the extension of the wire 144 above the level of the cover 143 is limited to that extent that should pressure be applied on top of the wire to bend it downwardly through the slot 145, the top end of the wire 144 will reach the top plane of the cover 143 before any damage is done to the pickup element 139 or a permanent set created in the wire 144. That is, the extending length of the wire 144 is limited to serve as an additional safety factor. In the carriage 137, the element 72 therein is mounted to be in a reverse position from that of unit 44 so that its operating wire 146 is sloped to the left (viewed from the rear).

Secured to the bearing block 33 by one end is a steel wire 147 (.051 piano wire being suitable) by means of a screw 148 pressing a washer 149 thereagainst. This wire 147 is carried substantially horizontally rearwardly from the block 33 freely through the upper end of the bracket 130, freely through a bore of a clamp 150 to be rigidly connected thereto by means of a set screw 151. This clamp 150 is preferably made out of a light material, such as aluminum, to reduce weight. The under side of the clamp 150 is slotted transversely thereacross to have an under-cut forward edge. A clamp bolt 152 extends slidingly vertically through the clamp toward its rear end and carries a head 153, the forward edge of which is undercut to correspond with the forward edge of the clamp slot. A thumb nut 154 screw-threadedly engages the upper end of the bolt 152 from the top side of the clamp 150 as means for causing the bolt 152 to travel longitudinally and permit the head 153 to be pulled up within the under slot of the clamp 150.

The wire 147 may be reduced to a thin rectangular cross-section 155 for a portion of its length adjacent the bearing block 33. This section has a horizontal width equal to the normal diameter of the wire 147 but its vertical thickness is reduced such as by grinding the wire from the upper and under sides to leave the final section thickness. This section reduced in thickness in relation to the normal diameter of the wire 147 permits the wire 147 to flex in an up and down manner through this section 155. Toward the other end of the wire 147 a section 156 may be provided to have a width in a vertical direction less than the diameter of the wire produced, such as by grinding the wire from both sides. This section 156 permits the wire 147 to flex throughout that zone in lateral directions as opposed to vertical directions. Preferably the section 156 is within the bore of the clamp 150.

A plate 157 extends from the top of the bracket 130 rearwardly thereof and is provided with a notch or slot entering from the rear edge within which is normally centered a lug 158 extending upwardly from the clamp 150 as a safety limit stop. The notch in the plate 157 is made to be somewhat wider than the lug 158 so as to permit a limited travel horizontally between the faces of the notch. Also the clamp 150 is so positioned in accordance with the length of the wire 147 that the lug 158 is spaced somewhat rearwardly of the forward face of the plate notch.

To the other bearing block 50 is secured a steel wire 160 identical with the wire 147 in respect to size, the two thin flexible sections, and length. The wire 160 extends freely through the bracket 131 and engages by its rear end in a clamp 161 which is identical to the clamp 150 already described. The clamp 160 is likewise limited in horizontal travel by means of a lug 162 extending vertically upwardly through a notch in the cover plate 163 secured to the top of the bracket 131. In the present form of the invention, both bracket cover plates 157 and 163 overhang their respective brackets so as to receive the upturned clamp lugs 158 and 162 within the respective notches.

A vibrator bar 164 is formed out of any suitable light metal that is quite rigid in nature, such as an aluminum alloy. The under side of the bar 164 is provided with a slot 165 of any cross-section shape, herein shown as V-shaped, extending longitudinally throughout the length of the bar in parallel relation to its edges. The edges of the bar are beveled to slope inwardly from the top face of the bar, the slope of these edges corresponding to the slopes of the forward undercut edge of the slot in the clamps 150 and 161 and the heads 153 of the bolts 152. The vibrator bar 164 has the respective clamps 150 and 161 engaged therealong to have the V-slot face turned downwardly. The clamps 150 and 161 may be fixed in position along the vibrator bar 164 by tightening the nuts 154 to clamp the bar 164 against the upper faces of the slots across the respective clamps by reason of the bolt heads 153 having their beveled edges engaging against the corresponding beveled edge of the bar 164.

When the vibrator bar 164 is thus engaged with the two clamps 150 and 161, the slot 165 will receive the upper ends of the pickup unit operating wires 144 and 146, the upper ends of these wires operating in effect as trolleys so that each or both of the carriages 136 and 137 may be shifted along the bar 132 to have the upper ends of the operating wires 144 and 146 slide along in that vibrator bar slot 165 without interfering with or requiring any change in position of the vibrator bar 164 in relation to its attached clamps 150 and 161, that is, unless the bar 164 must be shifted to have a major length extend beyond one of the brackets 130 or 131 to take care of some unusual unbalanced condition of the test part.

In any event, the vibrator bar will be so set up as to have the clamps 150 and 161 secured thereto in those positions where their respective lugs 158 and 162 will be substantially centered within the respective notches of the bracket cover plates 157 and 163. Thus it is to be seen that the vibrator bar 164 with its attached clamps from which extend the respective wires 147 and 160, rests entirely upon the two pickup unit wires 144 and 146. The entire mass, however, of the assembly resting on these wires is low, this mass being further reduced, in the present showing, by reason of the plurality of holes 166 being provided through the bar 164. The under groove 165 is parallel to the axis of the bearing plates 35 and 56. The electrical conductors 104 and 105, leading respectively from the pickup units in the carriages 137 and 136, are of sufficient length to permit shifting of the carriages along the bar 132 without restraint by those conductors.

The foregoing structure is designed to indicate condition of balance by shifting of the carriages 136 and 137 along the bar 132 to have the pickup unit operating wire in one of those carriages at a nodable point (no electrical output), and the other pickup unit operating wire located to receive vibrations from that end of the piece then being considered.

For employment of this method of determining the condition of balance by securing the otherwise vibrated bar 164 against vibration in a plane of correction, the following structure is added.

This structure is shown in detail in Figs. 8–10. A pair of right and left brackets 170 and 171 respectively are provided with base portions to slidingly engage over the top side and front and back faces of the bar 132, and are further provided with clamp bars 172 and 173 respectively to extend across under the bar 132 to be drawn upwardly and against by any suitable means, such as by screws 174 passing through those bars and engaging in the undersides of the brackets 170 and 171. In this condition these brackets may be selectively positioned along the bar 132. Each bracket carries an upturned arm 175 extending rearwardly and upwardly from the bar 132. On the upper end of the arm 175 is a head 176 along the side of which is loosely positioned a clamp plate 177 by means of a bolt 178 passing through the plate 177 and freely through the head 176 to carry a compression spring 179 therearound. A nut 180 on the bolt 178 serves as a means to compress this spring 179 to determine the pressure of the plate 177 against the side of the head 176. To prevent rotation of the plate 177 about the bolt 178, a pin 181 is fixed in the head 176 to project therefrom and extend freely through an end portion of the plate. Preferably a spacing washer 182 is carried on the pin 181 between the head and the plate.

The bar 164 is engaged by a light weight clamp block 183 which rests on its top side and which carries an under jaw 184 to engage over the rear bevelled edge of the bar. On the forward end of the block 183 is a clamp plate 185 supported thereby by means of a stud 186 extending from the block and having a nut 187 engaging its outer end to pull the plate 185 toward the end of the block 183. This plate 185 is notched to engage over the forward edge of the bar 164 so that tightening of the nut 187 will secure the plate 185 and the block 183 rigidly at selective positions along the bar 164.

Fixed to the clamp plate 185 in each instance is a leaf spring 188 and so mounted as to extend rearwardly by a length sufficient to enter between the head 176 and its clamp plate 177. The spring 188 is slotted to permit the bar 164 to pass freely therethrough.

In each head 176, is rotatively carried a vertical spindle 189. A transverse bore 190 in the head 176 carries a pin 191 of sufficient length that when the pin abuts the spindle 189 by its inner end, it will extend from the head 176 a sufficient distance to push the plate 177 against the pull of the spring 179 a sufficient distance to remove all pressure from the end of the spring 188. The bore 190 extends transversely across the bore through which the spindle 189 is carried. A portion of the spindle 189 at the zone of the bore 190 carries a flat face so that upon suitable turning of the spindle 189, this flat face will be brought around to be abutted by the inner end of the pin 191 thereby permitting the spring 179, through the bolt 178 to pull the clamp plate 177 firmly against the end of the spring 188 to form a non-slipping connection therewith. In this condition, the bar 164 will be firmly held against fore and aft vibration in respect to the position of the head 176, but the bar 164 may pivot by flexing of the spring 188 to have the center of turning of the bar 164 substantially centered in the V groove on its under side.

On each end of the spindles 189, which ends extend upwardly beyond the heads 176, is fixed an arm 192 to have upturned fingers 193, one of which fingers may be longer than the other to serve as a finger grip for the operator. A connecting plate 194 is provided with a series of relatively closely spaced holes 195 therethrough whereby the fingers 193 may be received therethrough to cause the arms 192 to swing in unison when either arm is shifted. The flat faces on the spindles 189 are so disposed, when the fingers are thus interconnected by the plate 194, that one flat face cooperates with the pin 191, while the other flat face is out of engagement with its corresponding pin 191.

As above indicated, these brackets 170 and 171 are formed as right and left members respectively, the primary distinction being that the spring 188 is in each instance mounted on the outer opposing side of the bracket as indicated in Fig. 8.

OPERATION

*Nullification of reactive effect by shifting pickup units*

The right and left-hand vibration pickup carriages are properly adjusted along the bars 15 and 16 to have their respective bearing plates 35 and 56 positioned to receive the small motor armature 57, which is the part selected for describing a balancing operation in the present instance. The belt 58 is looped over the armature 57 and the armature shaft ends are placed across the bearing plates 35 and 56.

In this "nullification" method, the mechanically restraining structures above described are not employed. The springs 188 are allowed to remain clamped by their forward ends to the vibration bar 164, but, by shifting the connecting plate 194 to a central position, the clamp plates 177 are both simultaneously released from the rear end portions of the springs 188 to allow both the springs 188 to travel freely in fore and aft directions in accordance with vibrations of the bar 164.

To supply the necessary difference in light reflecting ability at the exposed left-hand end of the armature 57, some marking of the armature may be required. In some instances there may be a limited section of the armature end which will reflect light while the other part will not. However, in most cases a tab of some material may be required to be secured to the armature or, more simply, a mark placed directly on the armature. In the present instance, assuming the armature color to be dark as opposed to white and of substantially non-reflecting characteristic, a white mark 109 is formed in any suitable manner, such as chalking or painting a band of white or aluminum paint across the end in a radial manner. Obviously the same result could be had by applying a sticker. The exact circumferential width of this mark is not critical but is preferably of substantial width ranging from ten to around thirty degrees, particularly where, as in the present example, the armature 57 is of the small fractional horsepower type.

The headstock 73 is fixed in position along the bars 15 and 16, the left-hand carriage being preferably in close proximity thereto. The exciter lamp 80 is adjusted longitudinally of its supporting tube 83 and the tube itself shifted and tilted to focus the beam of light from that lamp onto the left-hand armature end, the best adjustment being secured when the lamp is moved slightly closer to its lens 81 than when in the position to give the sharpest image of the lamp filament on the work. The projected filament image should form a radial line on the end surface of the armature 57, this adjustment to the radial position being secured by twisting axially the lamp 80. In one present form of the invention, the distance between the lens and the armature end is within the range of five to eight inches. The switch 107 is closed to set the motor 59 into operation, it being assumed that the belt 58 has been properly aligned to have it extend downwardly on both front and back sides of the armature 57 in substantial vertical parallel alignment.

The motor 59 is preferably operated at speeds which will revolve the armature 57 at a speed well above resonance of the whole vibrating assembly. The natural period of vibration, or the resonance point, is generally low due to the laterally resilient bearing supports. Speeds above resonance are chosen on account of the fact that the angle indication (position to correct unbalance) becomes more stable and the amplitude of vibration due to unbalance is greater than at lower speeds. Fans should be balanced at their operating speeds whenever possible in order to correct for aero dynamic as well as mechanical unbalance.

When the rotating armature 57 is brought up to the maximum selected speed, the unbalance of it will set up horizontally directed vibrations in the two laterally resilient spring supported bearings 35 and 56 which in turn will be reflected through the resepective bearing block connected wires 147 and 160 to generate voltages by that transmitted vibration in each instance in the respective pickup units 44 and 72.

The voltages separately generated by the imparted vibrations to these pickups are selectively applied through the left-right selector switch 94 to the vertical set of cathode ray control plates. The purpose of these pickup units is to change the mechanical vibration of the bearings into electrical pulsating voltage which will be of the same frequency and be proportional to the amount of mechanical unbalance.

The power line supply switch 93 is closed and this closed position will be indicated by illumination of the pilot lamp 99. Also the exciter lamp 80 will be energized. The beam of light emitted through the small lens 81 passes through the lens 82 and is so aligned and focused as to form a light band radially across the end of the armature 57. The light from this source reflected from the end of the generator as it rotates is focused through the larger lens 82 on the light sensitive member in the PE cell 79. Since the mark or band 109 has higher light reflecting ability than the remainder of the armature end, the voltage applied to and varied by the PE cell due to the light reflected from that limited area will be of an impulsive or fluctuating type, one fluctuation occurring for each revolution of the armature having a single marking.

While reference has been made to a specific form of mark 109, for special test, different shapes of marks may be employed in place of the radial line or band, depending upon the shape of the trace or the trace pattern to be visualized on the cathode ray screen. The band type of marking is most practical because of its simplicity and ease of application, and also because of the simplified trace pattern obtained on the cathode ray screen.

The voltage varied by the PE cell 79 is amplified in the usual and well known manner as illustrated by the wiring diagram in Fig. 11, and this amplified impulsive voltage is applied to the horizontal set of the cathode ray tube plates. Now if proper electrical adjustments in the circuit have been previously made in respect to location, intensity, and pattern, a trace will appear upon the screen of the tube 102 having the pattern as shown in Fig. 4, wherein a single vertical line appears accompanied by a short horizontal line. The vertical line or trace, being induced by the vibrator voltage applied to the vertical control plates, indicates the amount of unbalance in the correctional plane near that bearing for which pickup unit the left-right switch 94 is thrown. The horizontal line is that part of the trace induced by voltage passed by the PE cell resulting from the rotating mark 109. The right-left selector switch 94 is employed to electrically select and permit reading the amount of vibration of either the left or the right end of the armature 57.

The vertical gain control 121 is adjusted through the socket 97 by a suitable removable plug or key (not shown) to cause the vertical height of the trace on the cathode ray tube screen to be somewhat less than the full scale height. The horizontal gain control 122 is adjusted through the socket 98 until the horizontal peak on the trace may be easily identified, such as about one-eighth inch in horizontal length. This peak is the one which is caused by the change in reflected light reaching the PE cell to "valve" through more voltage as the marked scanning surface of the armature 57 rotates through the light beam. Turning the handwheel 89 will cause the peak of the trace to move up or down the full length of the vertical trace. The balancer is adjusted in such manner that when the peak is at the top of the trace line, the light side of the part being balanced will be on the top thereof opposite the heavy side position above referred to.

From a specimen piece run wherein the piece is normally in or brought to balance and to or from which a known test weight is added or subtracted to produce a known unbalance in a predetermined correction plane, the following conditions are made known for production running, namely, the maximum height of the trace or line on the scale of the cathode ray tube indicates an amount of unbalance equal to the weight of the test weight added or removed from the specimen part; only the amount of unbalance in the left correction plane is to be read on the screen with the selector switch 94 in the left-hand position; and only the amount of unbalance in the right correction plane is to be read on the screen with the selector switch 94 in the right-hand position.

A test weight is added to the test specimen, for example, in the left correction plane (arbitrarily selected as a convenient or possible location in the production pieces for addition or subtraction of weight to effect balance). The test piece is then revolved and the selector switch 94 is shifted to the right to cause the output of the right-hand pick-up unit 136 to be reflected on the cathode ray tube screen. The right-hand pick-up unit carriage 136 is shifted along the bar 132—properly termed a way bar—until a minimum or zero height of light trace on the screen is observed. Then the carriage 136 is clamped to fixed position on the way bar 132. This has been done while ignoring the position of the left-hand carriage 137.

The test piece is brought to rest and the test weight is transferred from the left to the right-hand correction plane on the piece, whereupon the test piece is again revolved. The selector switch 94 is shifted to the left and the left-hand carriage 137 is shifted along the way bar 132 until the vertical trace on the screen drops to a minimum or zero height. Then the carriage 137 is clamped to fixed position on the way bar 132. Thus both carriages 136 and 137 have now been fixed in positions to have their "trolley" wires 144 and 146 respectively at the nodal points along the vibrator bar 164. A primary advantage of the invention resides in this feature of being able to shift the pick-up unit connections with the vibrator bar to nodal points while the piece to be balanced is actually running.

It is necessary to determine the circumferential or angle position in each correction plane of the part to be checked where the weight is to be added or subtracted. With the same specimen piece, the piece is again rotated with the selector switch 94 closed to cause the vertical trace for that position to appear on the tube screen at its maximum length, assuming that a weight has been added in the correction plane of the piece to produce a known heavy spot location. The balancer is started, and the right-left selector switch 94 is shifted properly to read the unbalance. The horizontal line or impulse peak of the trace is shifted to the very bottom of the vertical trace line by turning the handwheel 89. The handwheel 89 is left in that position and the specimen piece is brought to a stop in the position where the mark 109 on its end is centered on the filament image thereon of the exciter lamp 80. The position taken by the known heavy spot is the correct position for removing weight to correct the unbalanced condition. The number of degrees read upon the drum 90 between the handwheel position and the known spot of heavy weight determines the location of that spot for removal of weight to correct the unbalanced condition. To permit this reading to be taken directly from zero, the handwheel 89 may be adjusted on its shaft 76 by loosening the screw 120 and shifting the wheel to have the zero position of the drum at the indicator 91 and then tightening the screw, whereupon rotation of the handwheel 89 to the known heavy spot will give directly the angular distance in degrees.

To locate the angular position of the "light weight" spot, advantage is taken of the fact that by rotating the handwheel to rotate the light beam, the horizontal trace line on the screen is brought to the top of the vertical trace line where zero phase displacement is indicated between the vibration induced voltage and the PE cell voltage. With the horizontal screen line so shifted, the spot for balance correction always occurs at the same position (relative to the machine) on the specimen piece and will be on the top forward side of the piece where the spot is visible and accessible to the operator, and weight would be added at this spot. An indicator pointer (not shown) may be used to point to this exact spot for reference. Weight could be subtracted from the opposite 180 degrees removed point whichever is more mechanically expedient in production, and a 180 degrees shift in phase relation, as indicated by the trace on the cathode ray tube screen, allows the operator an instantaneous choice of either method of correction by adding or subtracting weight without further manipulation of the balancer. It is to be noted that by use of the horizontal line position shifted to the end position of the vertical trace, possibility is eliminated of 180 degrees, or light-side heavy-side, error in judgment of the operator.

Now going to the production run on the armature 57, and assuming that the balancer has been set up and adjusted by the use of the specimen piece, the height of the vertical line on the cathode ray tube screen for either end vibration pick-up unit will indicate the amount of unbalance in the particular correction plane in proportion to the original specimen weight employed. That is, if the vertical trace line is one-half the length of the line set up by the specimen weight, then the unbalanced condition requires one-half of that weight for correction. Specifically, the routine steps to be followed in balancing the piece 57 would be as follows. The carriages 136 and 137 are not shifted at any time during the production run from their positions determined during the test specimen run. Start the balancer to have the piece 57 rotating; throw the switch 94 to the left; adjust the handwheel 89 to bring the horizontal line to the top of the vertical trace line on the tube screen; and record the height of the vertical trace in reference to the screen scale and also record the angle reading on the handwheel drum 90. Throw the selector switch to the right and adjust the handwheel until the horizontal trace line is again at the top of the vertical trace; record the scale height of the vertical trace, and the drum reading of the handwheel—leave the handwheel set for the first correction operation (right end). Stop the piece 57 to have the mark 109 centered on the spot of light; and mark the right end of the piece 57 with a figure indicating the relative amount of unbalance, placing this mark at the point of correction. Shift the handwheel 89 back to the recorded angle for the left-hand position; line up the mark 109 with the spot of light; and mark the left-hand end of the piece 57 with a figure representing the relative amount of unbalance at the correction point. Then finally remove the piece 57 from the balancer, and make the corrections indicated by the required addition or subtraction of weight, such as by soldering, drilling, or the like as the practice may be selected.

Due to sensitivity of the pickup units 44 and 72 to lateral vibration, it is preferable to locate the balancer on the ground floor to have the balancer bench supported directly on concrete and as remote as possible from heavy running machinery. If extraneous vibration cannot be avoided, the balancer frame should be isolated by mounting it on springs or a vibration damping medium.

*Mechanical restraint method*

The pickup units 44 and 72 are preferably equalized in reference to each other to equalize the tube scale sensitivity by any suitable means, such as by the adjustable resistances 200 and 201, Fig. 11. The pickup carriers 136 and 137 are shifted along the bar 132 to those positions to give a trace on the screen of the tube 102 of a height proportionate to the degree of unbalance determined as above described. It is practically immaterial as to the exact location of these carriers along the bar 132 in the mechanical pivoting method. The effect is obtained that, by shifting a carriage away from the pivot, correction plane, a mechanical amplification of the pick-up unit output is had to give a longer vertical trace on the cathode ray tube screen, by reason of the greater amplitude of vibration of the pick-up unit "trolley" wire. A determining factor of carriage location is to secure a light trace within the screen limits, and as above indicated, a trace that will be proportionate to the degree of unbalance of the piece being checked, particularly in respect to comparative unbalance in both correction planes. Then the brackets 170 and 171 are shifted along and clamped to the bar 132 to have their respective springs 188 positioned in the respective selected correction planes of the rotor 57. Then by shifting of the clamps through operation of the connecting bar 194, either the right- or left-hand spring is gripped. For example, if the right-hand spring 188 (viewed from the rear, Fig. 8) is clamped, the left-hand spring is free and the bar 164 is free to oscillate on the right-hand spring which, in effect, establishes a pivot of bar oscillation approximately midway across the width of the bar 164. The oscillation is created by vibration of the left-hand (rear view) bearing block 33 and, accordingly pickup unit 44 is actuated to have its voltage only reflected on the screen of the tube 102, the selector switch 94 being operated to put that voltage into the tube plate circuit as above indicated. At the same time, the bar 164, being restrained in the right-hand (rear view) correction plane, prevents any appreciable generation of voltage in the unit 72. In any event, by this restraining of the bar 164, there is no appreciable reaction effect from unbalance in the right-hand end upon the left-hand end then being checked. Thus by selective clamping of the springs 188, and shifting of the selector switch 94, either end of the rotor 57 may be checked one at a time for balance condition.

While the invention has above been described in particular detail, it is obvious that mechanical changes in design and variations in electrical elements and circuits may be employed without departing from the spirit of the invention, and it is therefore intended that the invention be not limited to that precise description any more than may be required by the following claims.

I claim:

1. In a machine for indicating balance of a rotatable body, the combination of a pair of spaced apart axially aligned bearings to carry the body; means constraining the bearings to lateral vibrations; a track fixed in parallel relation to the axis of said bearings; a pair of vibration induced voltage generators; a carriage for each of said generators mounted to be shiftable along said track and selectively fixed therealong; a laterally vibratile member extending upwardly from each of said generators for actuating the generators; a substantially rigid vibration bar formed with a track along its under side to receive upper portions of said generator vibratile members therealong secure against lateral displacement, said bar having its weight supported by said vibratile members; and a connector member interconnecting each of said bearings with said bar, said interconnecting members being mounted to be held in substantially parallel alignment and normal to said bearing axis.

2. In a machine for indicating balance of a rotatable body, the combination of a pair of spaced apart axially aligned bearings to carry the body; means constraining the bearings to lateral vibrations; a track fixed in parallel relation to the axis of said bearings; a pair of vibration induced voltage generators; a carriage for each of said generators mounted to be shiftable along said track and selectively fixed therealong; a laterally vibratile member extending upwardly from each of said generators for actuating the generators; a substantially rigid vibration bar formed with a track along its under side to receive upper portions of said generator vibratile members therealong secure against lateral displacement, said bar having its weight supported by said vibratile members; and a connector member interconnecting each of said bearings with said bar, said interconnecting members being mounted to be held in substantially parallel alignment and normal to said bearing axis; said vibratile members being resilient in vertical planes to cushion said vibration bar.

3. In a machine for indicating balance of a rotatable body, the combination of a pair of spaced apart axially aligned bearings to carry the body; means constraining the bearings to lateral vibrations; a way fixed in parallel relation to the axis of said bearings; a pair of vibration induced voltage generators; a carriage for each of said generators mounted to be shiftable along said way and selectively fixed therealong; a laterally vibratile member extending upwardly from each of said generators for actuating the generators; a substantially rigid vibration bar formed with a track along its under side to receive upper portions of said generator vibratile members therealong secure against lateral displacement, said bar having its weight supported by said vibratile members; a connector member interconnecting each of said bearings with said bar, said interconnecting members being mounted to be held in substantially parallel alignment and normal to said bearing axis; and means carried by said way shiftable therealong independently of said carriages selectively pivoting said vibration bar.

4. In a machine for indicating balance of a rotatable body, the combination of a pair of spaced apart axially aligned bearings to carry the body; means constraining the bearings to lateral vibrations; a way fixed in parallel relation to the axis of said bearings; a pair of vibration induced voltage generators; a carriage for each of said generators mounted to be shiftable along said way and selectively fixed therealong; a laterally vibratile member extending upwardly from each of said generators for actuating the generators; a substantially rigid vibration bar formed with a track along its under side to receive upper portions of said generator vibratile members therealong secure against lateral displacement, said bar having its weight supported by said vibratile members; a connector member interconnecting each of said bearings with said bar, said interconnecting members being mounted to be held in substantially parallel alignment and normal to said bearing axis; and means carried by said way shiftable therealong independently of said carriages selectively pivoting said vibration bar; said pivoting means comprising a bracket engaging said way, a leaf spring secured by one end to said bracket, and a bar engaging clamp carried by the other spring end.

5. In a machine for indicating balance of a rotatable body, the combination of a pair of spaced apart axially aligned bearings to carry the body; means constraining the bearings to lateral vibrations; a way fixed in parallel relation to the axis of said bearings; a pair of vibration induced voltage generators; a carriage for each of said generators mounted to be shiftable along said way and selectively fixed therealong; a laterally vibratile member extending upwardly from each of said generators for actuating the generators; a substantially rigid vibration bar formed with a track along its under side to receive upper portions of said generator vibratile members therealong secure against lateral displacement, said bar having its weight supported by said vibratile members; and a connector member interconnecting each of said bearings with said bar, said interconnecting members being mounted to be held in substantially parallel alignment and normal to said bearing axis; a second source of voltage; means for modifying that second voltage in accordance with rotation of said body; and indicating means plotting the voltage outputs of said generators against said modified second voltage.

6. In a dynamic balancer for balancing a rotatable member, a pair of spaced apart, laterally resiliently mounted members for carrying the rotatable member; a vibration bar; a vibration transmitting member extending from each of said carrying members toward said bar; means interengaging said transmitting members with said bar at spaced apart zones; a pair of vibration induced voltage generators fixed against vibration; an operating member extending upwardly from each generator; a track along which said generators are shiftable parallel to the normally positioned axis of said carrying members; said operating members each terminating by an upper end supporting said bar; and means for shifting at least one of said operating members along said bar in reference to the location of one of said transmitting members.

7. In a machine for indicating balance of a rotatable body, the combination of a pair of spaced apart axially aligned bearings to carry the body; means constraining the bearings to lateral vibrations; a way fixed in parallel relation to the axis of said bearings; a pair of vibration induced voltage generators; a carriage for each of said generators mounted to be shiftable along said way and selectively fixed therealong; a laterally vibratile member extending upwardly from each of said generators for actuating the generators; a substantially rigid vibration bar formed with a track along its under side to receive upper portions of said generator vibratile members therealong secure against lateral displacement, said bar having its weight supported by said vibratile members; and a connector member interconnecting each of said bearings with said bar, said interconnecting members being mounted to be held in substantially parallel alignment and normal to said bearing axis; and means carried by said way shiftable therealong independently of said carriages selectively pivoting said vibration bar; said pivoting means comprising a bracket engaging said way, a pivot member, means interconnecting one end of the member with said bar, and means selectively clamping the other end of the member to said bracket.

8. In a device for analyzing unbalance of a rotatable member, a pair of spaced apart, laterally resiliently mounted bearing members to support said rotatable member; a vibration bar; a vibration transmitting member extending from each of said bearing members and interconnected with said bar; means for selectively pivoting said bar substantially within selected planes of unbalance correction; a pair of vibration actuated voltage generators; and generator operating members bearing against said bar and shiftable therealong to positions to either side of said transmitting members and also independent of positions of said pivoting means; said bar having a track; and each of said generator operating members slidingly engaging said track to support said bar, and further being characterized by being resilient vertically and sufficiently rigid laterally to actuate the generators when subjected to lateral vibrations.

9. In a device for analyzing unbalance of a rotor, a pair of laterally vibratile rotor bearings; a vibrated bar; a vibration transmitting member interconnecting each of said bearings with said bar to position the bar in substantial parallelism with the axis of said bearings; a pair of pick-up units shiftably carried in a line substantially parallel to said bar; said bar having a groove extending longitudinally along its under side; and a pick-up unit actuating member extending from each of said units to enter by an upwardly extending end portion slidingly along said groove, whereby said bar is supported on said actuating members at any selected positions thereof along the bar.

ROBERT B. ANNIS.

REFERENCES CITED

The following references are of record in the file of this patent:

UNITED STATES PATENTS

| Number | Name | Date |
| --- | --- | --- |
| 1,876,524 | Thearle | Sept. 6, 1932 |
| 2,122,621 | Ohly | July 5, 1938 |
| 2,131,602 | Thearle | Sept. 27, 1938 |
| 2,167,488 | Ohlson | July 25, 1939 |
| 2,289,074 | Rushing et al. | July 7, 1942 |
| 2,289,200 | Lundgren | July 7, 1942 |
| 2,329,654 | Rouy | Sept. 14, 1943 |
| 2,130,122 | Dybvig | Sept. 13, 1938 |
| 2,165,024 | Baker et al. | July 4, 1939 |
| 2,243,458 | Esval et al. | May 27, 1941 |
| 2,293,371 | Van Degrift | Aug. 18, 1942 |
| 2,329,835 | Hope et al. | Sept. 21, 1943 |